UNITED STATES PATENT OFFICE.

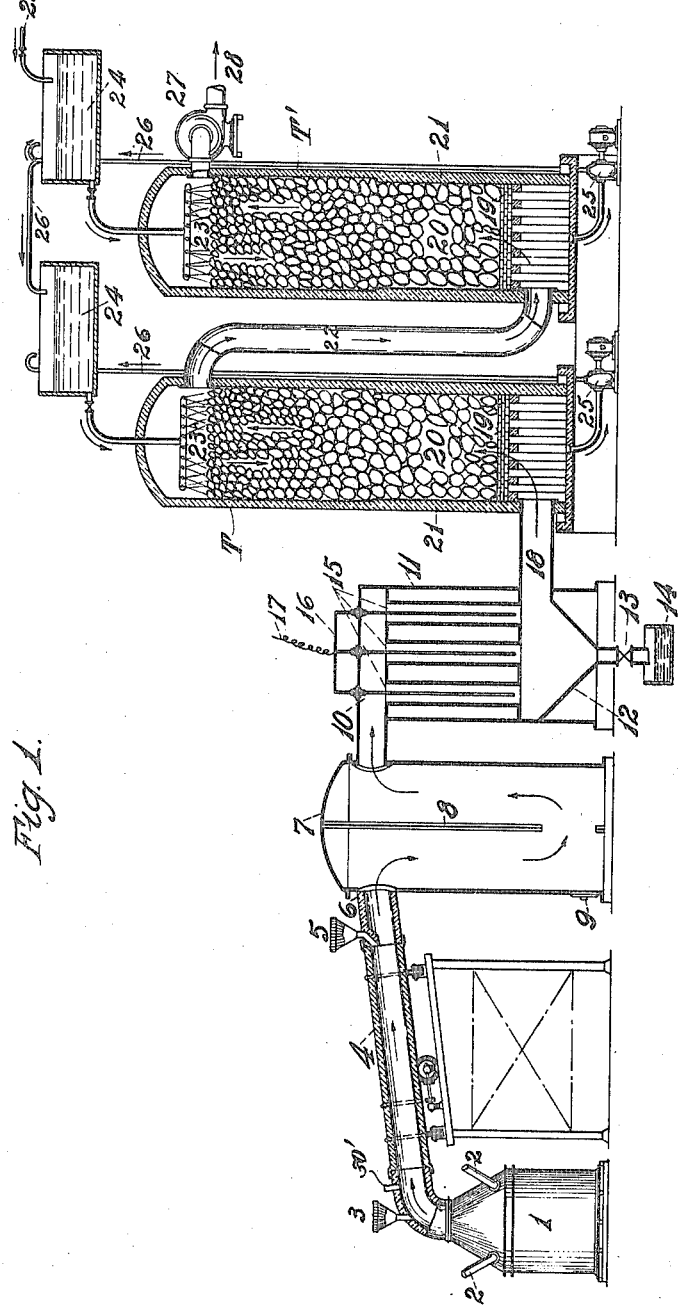

INGENUIN HECHENBLEIKNER, OF CHARLOTTE, NORTH CAROLINA, ASSIGNOR TO SOUTHERN ELECTRO-CHEMICAL COMPANY, OF NEW YORK, N. Y., A CORPORATION OF NEW JERSEY.

CONDENSING GASES FROM ELECTRIC FURNACES.

1,264,510.     Specification of Letters Patent.     Patented Apr. 30, 1918.

Application filed February 10, 1917. Serial No. 147,861.

*To all whom it may concern:*

Be it known that I, INGENUIN HECHENBLEIKNER, a citizen of the United States, residing at Charlotte, in the county of Mecklenburg and State of North Carolina, have invented certain new and useful Improvements in Condensing Gases from Electric Furnaces, of which the following is a specification.

This invention relates to certain novel and useful improvements in the treatment of gases and has particular application to a method of condensing gases produced in the manufacture of phosphoric acid by the electric furnace process.

In the production of phosphorus from phosphatic material, such as phosphate rock, it is the practice to feed into the furnace a charge composed of the phosphate rock, preferably in the form of calcium phosphate, a suitable flux, such as silica, and a carbonaceous material, such as carbon, charcoal or coke. The reaction which takes place in the electric furnace is represented by the following equation:

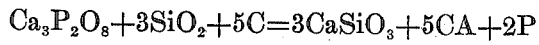

the oxidizable gases escaping in the form of carbon monoxid and phosphorus, the oxidization of such gases resulting as follows:

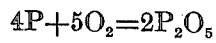

As is known, the phosphoric material generally employed in this process contains, in addition to calcuim phosphate ($Ca_3P_2O_8$), other mineral substances in appreciable quantities, such as calcium fluorid ($CaF_2$), silicon dioxid ($SiO_2$), calcium carbonate ($CaCO_3$) and iron and aluminum oxids ($Fe_2O_3$ and $Al_2O_3$). Thus the oxidized gases developed in this process contain, besides phosphorus pentoxid, carbon dioxid, nitrogen, and oxygen, large quantities of other gases and vapors derived from the impurities in the rock. Besides dust from the rock, sand and carbon there is produced silicon tetrafluorid ($SiF_4$) in appreciable quantities, as all mineral phosphate rocks contain calcium fluorid ($CaF_2$) sometimes in amounts up to 10%. In the heat of the electric furnace this calcium fluorid is decomposed as follows:

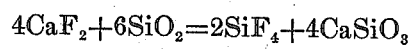

In my Patent No. 1,167,755 dated January 11, 1916, I have set forth an apparatus and process for oxidizing phosphorus, so as to produce a gas free from dust and at a sufficiently low temperature to enable it to be easily treated for further condensation. After the gases leave the dust chamber of the apparatus shown in said patent, and which apparatus in its fundamental features is incorporated in the structure set forth herein, such gases, at a lower temperature, contain mainly phosphorus pentoxid, carbon dioxid, nitrogen, oxygen and silicon fluorid. It is desirable to condense the silicon fluorid as well as the phosphorus pentoxid, as both of these not only possess a commercial value, but are very injurious to surrounding vegetation and territory if set free in gaseous form into the atmosphere. The condensation of both these gases together may be accomplished in scrubbing towers so that the resulting acid attained in the condensation of the gases is a mixture of phosphoric acid ($H_3PO_4$) and hydrofluosilicic acid ($H_2SiF_6$) and which product when utilized in the manufacture of fertilizer may be employed without separation into its components.

In many instances, however, it is desirable to produce these two acids separately to obtain a commercially pure phosphoric acid or a commercially pure hydrofluosilicic acid, and this may be accomplished by the method forming the subject matter of the present application.

In the present instance I propose to separate the phosphorus pentoxid solids by electrostatic precipitation subsequently treating the residual gases to obtain the hydrofluosilicic acid.

It is a well known fact that fine mechanical dust as well as vapors such as those of sulfur trioxid ($SO_3$), phosphorus pentoxid ($P_2O_5$) and sulfuric acid ($H_2SO_4$), etc., may be precipitated electrostatically and consequently, by my present invention, in treating gases issuing from the electric furnace during the production of phosphoric acid as hereinbefore mentioned, after such gases are freed from dust through the use of suitable apparatus such for instance as is shown in my Patent No. 1,167,755, and cooled down to a temperature not injurious to the standard apparatus used in the electric precipitator, I proceed to separate the phosphorus pentoxid solids by electrostatic action while the residual gases containing silicon tetrafluorid, in addition to nitrogen, oxygen and carbon dioxid are preferably subjected to the action of water sprays in scrubbing towers to give concentrated hydrofluosilicic acid ($H_2SiF_6$) according to the formula $$3SiF_4 + 3H_2O = 2H_2SiF_6 + H_2SiO_3$$

and in this way the phosphorus pentoxid and the silicon tetrafluorid are separately condensed and mixed with water to provide commercial phosphoric acid and hydrofluosilicic acid. The waste gases then remaining are free from harmful constituents and may be discharged into the surrounding atmosphere.

The invention consists in the process set forth in and falling within the scope of the appended claims.

In the drawing the figure is a view partly in side elevation and partly in section of one form of apparatus which may be employed in carrying out the process of the invention.

Referring now to the accompanying drawing in detail, the numeral 1 indicates an electric furnace provided with the usual electrodes 2, while the feeding hopper for the carbonaceous material, such as coke, is indicated by the numeral 3. Connected with the furnace 1 is an inclined rotary kiln 4 having a feeding hopper 5 through which the phosphate rock and sand may be fed down the kiln into the furnace where it is brought into contact with the carbon or coke, within the heating zone of the electrodes, the material passing down the kiln being preheated by the hot up-coming gases. The feed hopper 5 communicates with a coupling pipe 6 which connects the rotary kiln 4 with the dust or settling chamber 7, the latter having a vertical baffle wall 8 suitably located therein, a suitable cleanout door 9 being located at the bottom of the chamber. The construction and operation of the apparatus thus far described is set forth in my Patent No. 1,167,755 hereinbefore mentioned. Instead, however, of attaching an exhaust fan directly to the dust chamber 7, a pipe 10 leads from the upper end thereof and conducts the gas, practically freed from dust, to the electric precipitator 11. This latter, although it may be of any desired form, preferably comprises a shell which terminates in a hopper-like bottom 12 the lower end of which is provided with a valve 13, which controls the passage of the precipitated solids from the bottom into the receptacle 14. The latter is intended to contain water for taking up the solid or precipitated phosphorus pentoxid, thus providing commercial phosphoric acid. Within the casing or shell of the precipitator are pipes of suitable material such as metal or stoneware indicated at 15, through which pass the gases to be subjected to the electrical treatment, while 16 indicates electrodes inserted in these pipes and to which electrodes current is supplied through any suitable form of electrical conductor conveniently indicated at 17. A connecting pipe 18 leads from the bottom of the precipitator into the first scrubbing tower shown at T, in the first instance, there being two of such towers arranged in a series, the second tower being indicated at T'. Of course any suitable number of towers may be employed. Each tower embodies a support 19 arranged at the bottom of the tower casing 21, while 20 is the packing material for the distribution of the gases and acids. From the upper portion of the tower T a gas conduit 22 leads to the bottom of the second tower T'. Each tower is provided with an acid distributer 23, and with each acid distributer is connected a storage vessel 24. A pump 25 for circulating water and acid is connected with the bottom of each tower and from each tower there leads a pumping line 26 discharging into one of the tanks 24. An exhaust fan 27 is provided for drawing the gases from the electric furnace through the condensing system and discharging the same into the atmosphere through the exhaust 28. The water supply line is indicated conventionally at 29.

The above is a brief description of the structural features of the apparatus shown in the drawings and the operation thereof is as follows: The charge of phosphate rock and sand is fed continuously through the hopper 5 into the rotary kiln 4 and passes down the latter into the furnace, being preheated in its travel. Just before entering the furnace it is mixed with the carbonaceous material which is fed in through the hopper 3. After the gases are generated in the furnace and properly oxidized through the admission of oxygen gases, preferably in the form of air, through suitable openings or passageways 30', they pass through the rotary kiln, being cooled down in the latter, a portion of the heat being absorbed by the down-coming charge, and such gases then flow through the dust chamber 7 where they are freed of dust and after passing around the baffle 8 pass into the electric precipitator through the pipe 10. In this precipitator the stream of gases is divided up into numerous small streams which pass down through the pipes 15 and while therein are subjected to electrical action through the electrode discharge. The solid phosphorus pentoxid which is thus electrically precipitated from the gases settles on the pipes 15 and from time to time is deposited in the hopper bottom 12 of the precipitator from which it may be withdrawn through the valve 13 and treated with water in the receptacle 14 thus producing commercial phosphoric acid.

As the gases leave the precipitator they are of course now free from the phosphorus pentoxid and pass through the conduit or pipe 18 into the scrubbing towers wherein they are treated on the counter-current principle with water. That is to say, the gases flowing upward in the towers are treated with diluted acid or water flowing in the opposite direction or down the tower, the gases passing through both the absorption or scrubbing towers to give a complete absorption. The more diluted acid from the second tower is sprayed and circulated in the first tower while in such second tower water is added to the absorption system through the pipe line carrier 29 and circulated to give a diluted acid which is subsequently pumped into the first absorption tower and concentrated through the heat of the gases. Thus a complete absorption of the silicon tetrafluorid ($SiF_4$) is had and at the same time the hydrofluosilicic acid resulting is of a commercial concentration.

To obtain the best results in practice the gases flowing from the kiln to the dust chamber while having a relatively low temperature should not be cooled to such an extent as to cause the precipitation of the phosphorus pentoxid as a solid with the dust in such chamber but the pentoxid should be maintained at such temperature as will insure it remaining vaporized while it enters the precipitator.

While I have herein shown and described the preferred embodiment of the invention, I wish it to be understood that I do not limit myself to all the precise details herein set forth by way of illustration, as modification and variation may be made without departing from the spirit of the invention or exceeding the scope of the appended claims.

What I claim is:

1. The herein described method of treating gases containing phosphorus pentoxid and silicon fluorid, to separately produce phosphoric acid and hydrofluosilicic acid, which consists in electrically precipitating the phosphorus pentoxid as a solid and bringing said solid into contact with water to form phosphoric acid, and then passing the residual gases containing the silicon fluorid through an absorption system in contact with water to convert the silicon fluorid into hydrofluosilicic acid.

2. The herein described method of treating gases containing phosphorus pentoxid and silicon fluorid which consists in electrically precipitating the phosphorus pentoxid as a solid and subsequently removing the silicon fluorid by passing the residual gases containing the same in contact with water flowing in a direction opposed to the flow of the residual gases.

3. The herein described process of treating gases which consists in subjecting gases to the action of an electric precipitator to precipitate as a solid certain components of the gas and subsequently passing the residual gases through an absorption system operating on the counter-current principle.

4. The herein described method of treating gases containing phosphorus pentoxid and silicon fluorid which consists in precipitating the phosphorus pentoxid through electrical action and subsequently scrubbing the resultant gases to obtain hydrofluosilicic acid.

5. A step in the art of precipitating phosphoric acid comprising electrically precipitating phosphorus pentoxid as a solid from gases containing such phosphorus pentoxid and subsequently bringing such phosphorus pentoxid in contact with water to form phosphoric acid.

6. A step in the art of precipitating phosphoric acid which comprises preliminarily removing dust from the heated gases containing phosphorus pentoxid, and subsequently subjecting said heated gases to electrical precipitation to precipitate the phosphorus pentoxid as a solid and then bringing said solid into contact with water to form phosphoric acid.

7. The herein described method of treating gases containing phosphorus pentoxid and silicon fluorid which consists in preliminarily removing dust from the gases while the latter are in a heated state, subjecting the gases so cleaned to electrical precipitation to precipitate the phosphorus pentoxid as a solid, then subjecting the residual gases to absorption and then concentrating the resultant acid.

8. The herein described method of treating gases containing phosphorus pentoxid and silicon fluorid which consists in electrically precipitating the silicon fluorid and subsequently removing the silicon fluorid by passing the residual gases containing the same through an absorption and concentrating system operating on the counter-current principle.

In testimony whereof I affix my signature.

INGENUIN HECHENBLEIKNER.